Dec. 25, 1923.
J. J. STAMPEN
MILKING MACHINE
Filed Sept. 30, 1922
1,478,802
3 Sheets-Sheet 1
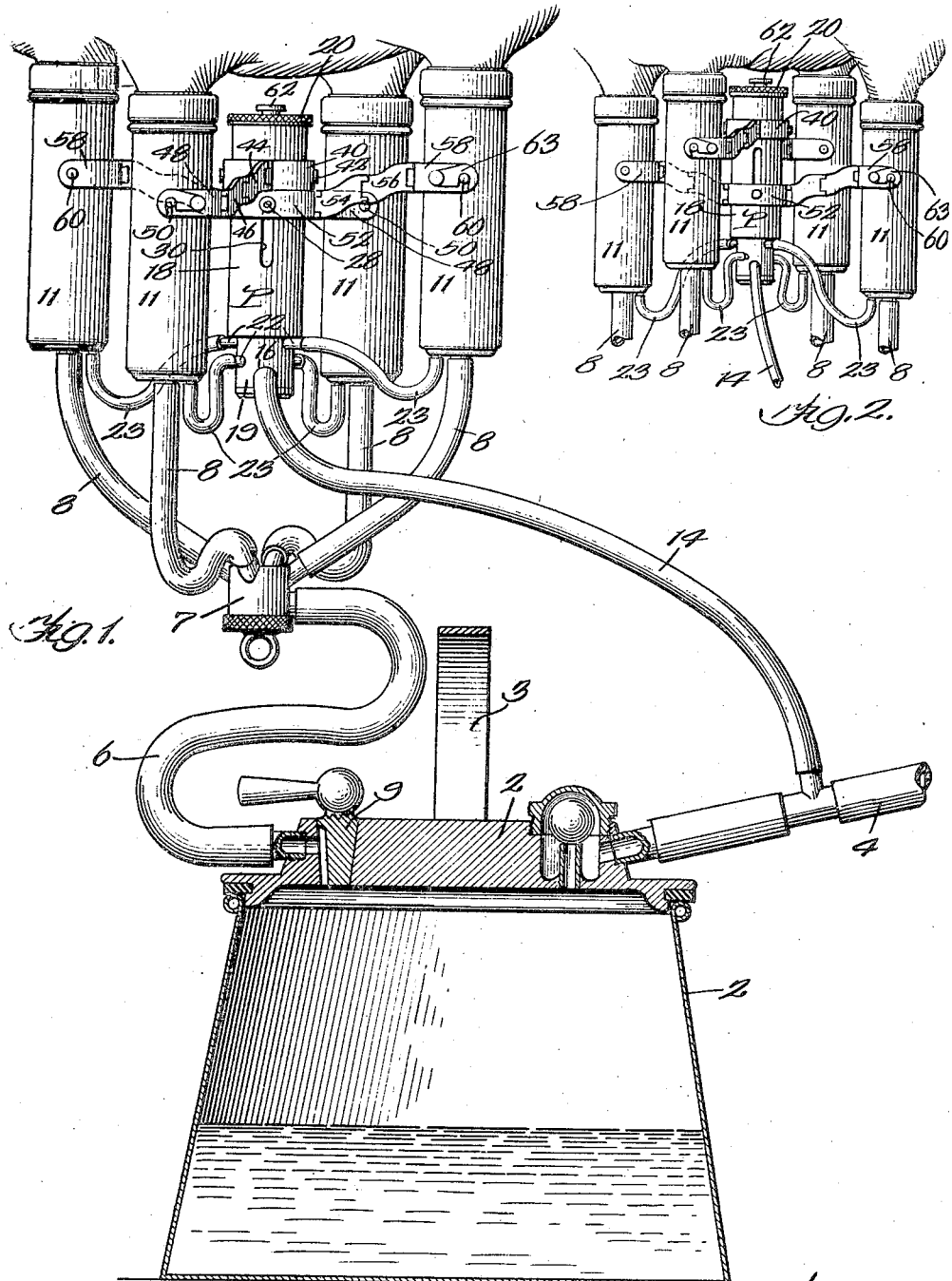

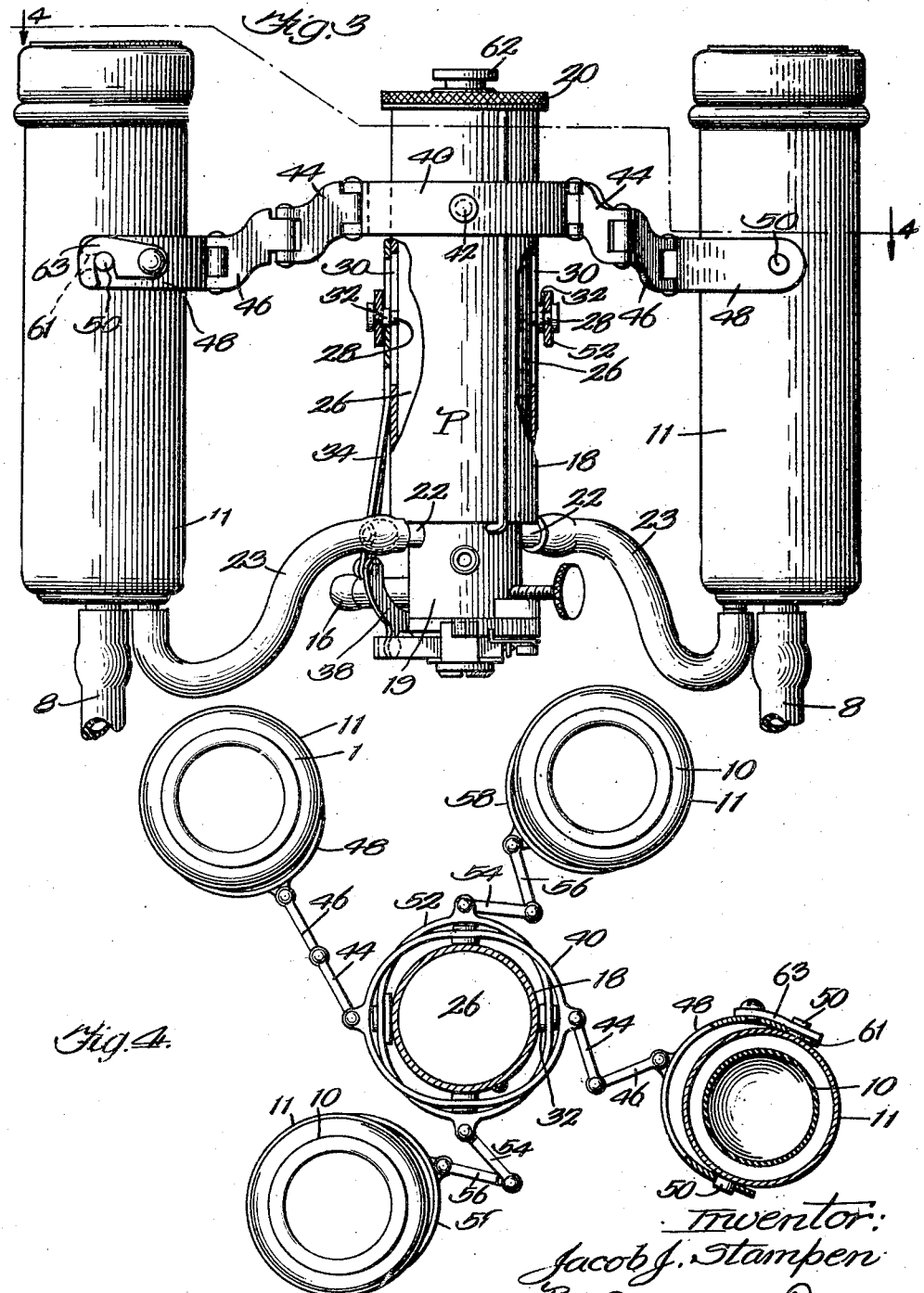

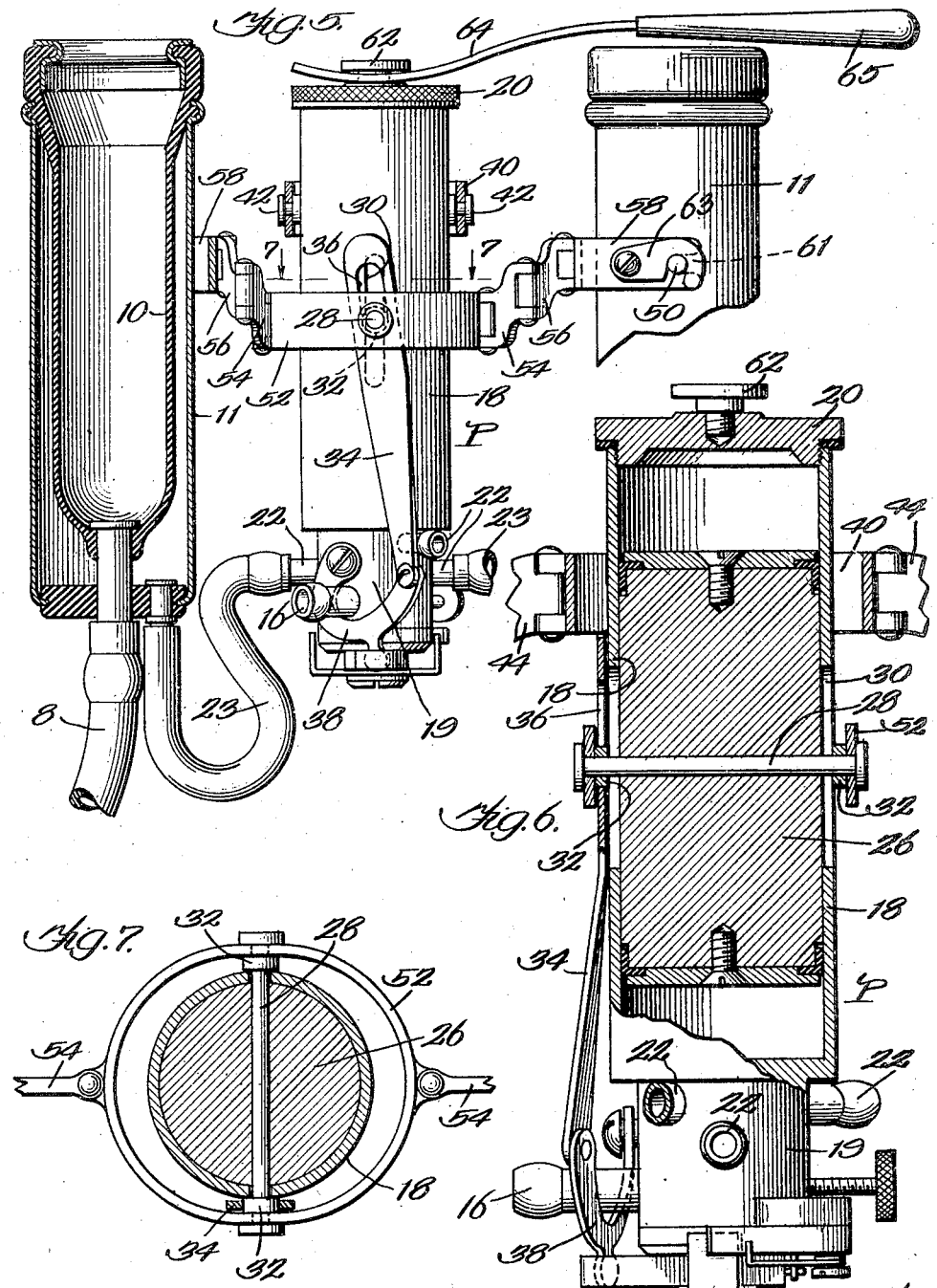

Patented Dec. 25, 1923.

1,478,802

UNITED STATES PATENT OFFICE.

JACOB J. STAMPEN, OF CHICAGO, ILLINOIS, ASSIGNOR TO PINE TREE MILKING MACHINE COMPANY, OF CHICAGO, ILLINOIS, A CORPORATION OF ILLINOIS.

MILKING MACHINE.

Application filed September 30, 1922. Serial No. 591,568.

*To all whom it may concern:*

Be it known that I, JACOB J. STAMPEN, a citizen of the United States, residing at Chicago, in the county of Cook and State of Illinois, have invented a certain new and useful Improvement in Milking Machines, of which the following is a specification.

My invention relates to milking machines, particularly of that type in which the teat cups are provided with rigid casings each having a flexible lining or "inflation" which is subject to the action of pulsatory air in the well-known manner. One of the objects of my present invention is to provide means whereby the teat cups may in addition to their previously known functions, move rhythmically toward and from the udder of the animal to press upon it at frequent intervals, very much as a calf would do when taking the milk. Another object, related to the first, is to provide a construction such that a teat cup will pull downward on the teat at the same time that it compresses it and will move upward at the same time that it releases it, thus simulating the action of a calf in taking the milk and also simulating the action in hand milking. Still another object is to provide a construction in which both teat cups and pulsator, that is, the device which controls the pulsatory air, are suspended from the udder instead of having the pulsator mounted upon the milk pail as heretofore.

I obtain my objects by the mechanism illustrated in the accompanying drawings, in which—

Figure 1 is an assembly view from the side showing the teat cups in acting position, also the pulsator and milk pail, the latter being in central vertical section.

Figure 2 is a side elevation of the teat cups as in Figure 1, but in changed position, thus illustrating the movement relatively to the udder.

Figure 3 is a side elevation of a pair of teat cups together with the pulsator, the latter being shown partly broken away to better reveal the construction.

Figure 4 is a plan section on the line 4—4 Fig. 3.

Figure 5 is a side elevation of a pair of teat cups, together with the pulsator, one of the cups being shown in section, and the view of the pulsator being taken looking toward the right in Figure 3.

Figure 6 is a side elevation of the pulsator, taken chiefly in axial section.

Figure 7 is a plan section on the line 7'—7, Figure 5.

Like numerals denote like parts throughout the several views.

While the form of milk pail and connecting tubes may be varied, I have illustrated a form in which the pail 1 is provided with a cover 2 having a handle 3. It is maintained under constant vacuum by being connected with a pipe 4 which leads to the vacuum line of the system. At one part of the cover a pipe 6 leads to a chamber or "claw" 7 having four flexible branch tubes 8 which lead to the inside of the linings or "inflations" 10 of the teat cups. These linings are resilient, being usually made partly or entirely or rubber, and are mounted in the teat cup casings 11 in the usual manner. It will be sufficient for the present purpose to state that the insides of the teat cup linings will thus be subjected to a gentle but constant vacuum and that the milk will flow down through the tubes 8, claw 7 and tube 6 to the inside of the pail.

A tube 14 leads from the pipe 4 or other source of vacuum to the pulsator which I have denoted in general by the letter "P." In the present case tube 14 is connected to a nipple 16 at the lower end of the pulsator as illustrated in Fig. 3. The pulsator has a casing 18 provided with an extension 19 at the bottom, which is rigidly secured to it or may be integral with it. A cover 20 hermetically seals the casing at the top. Leading radially in four directions from the extension 19 are nipples 22 which in practice are connected by flexible tubes 23 to the lower end of the casings 11 of the teat cups. These tubes lead to the space on the outside of the flexible lining and their purpose is to cause the air inside of the casing but outside of the lining to pulsate in order to cause the lining to collapse and expand in the well-known manner. Pulsators in themselves are not new and therefore it will be sufficient for the present purpose to say that in the type of pulsator selected to illustrate the invention a piston 26 moves up and down within the casing 18, and as a result alternately connects the tubes 23 with the vacuum and with the atmosphere. This is accomplished by valve mechanism located at the lower end of the casing 18 and operated by a rod 28 which passes through the piston and travels in slots 30 in the side of the casing 18. This rod projects beyond the sides of the casing and is provided with two spacing washers 32, which bear on the sides of the casing, and one of which operates a link 34. This link is a slot 36 in which one of the washers travels and the result is that the reciprocatory movement of the piston moves the link 34 up and down. Said link is connected to an arm 38 pivoted to the side of the extension 19. It operates the valve mechanism of the pulsator, but as the form of the valve mechanism is immaterial so far as my present invention is concerned it need not be described. It is sufficient to say that the construction is such that when the lining of the two diametrically opposite teat cups are being collapsed the linings of the remaining teat cups are being released (inflated) and vice versa, so that the action occurs in pairs, first one pair of teat cups compressing the teats of the animal and then the other pair.

According to my invention I have taken advantage of the reciprocatory movement of the piston within the pulsator casing 18 to produce relative longitudinal movements between the various teat cups, that is the alternating movements toward and from the udder in the manner described. Briefly stated, the teat cups are mounted in pairs, one carried by the casing and the other carried by the piston, which travels within it. According to the design illustrated there are two supporting frames, one mounted on the casing and the other on the piston. The fixed frame has a ring 40 pivotally mounted on pins 42 projecting from the side of the casing. At opposite sides of the rings are hinged brackets 44 adapted to swing about a vertical axis. At the ends of these hinged brackets are other brackets 46 hinged to them so as to swing about a vertical axis. At the outer ends of the brackets 46 are hangers 48 which are bifurcated and at their outer ends carry pins 50 by which a pair of teat cups is pivotally supported. It will be evident that this affords a very flexible mounting for the teat cups in the sense that they may be adjusted to various positions in a horizontal plane to accommodate the location of the teats of the animal, but they are nevertheless firmly held against relative movement in a vertical direction. In other words, they maintain their position vertically with reference to the casing of the pulsator but otherwise are free to be adjusted to the animal. The alternate pair of teat cups are supported from the plunger in a similar manner. A ring 52 surrounds the casing and is pivotally supported upon the rod 38. The construction is shown in detail in Figure 7. At diametrically opposite sides of the ring 52 are attached brackets 54 which are hinged in such manner as to swing about a vertical axis. At the outer ends of the brackets 54 are other brackets 56 which are hinged to them in such manner as to swing about vertical axes. At the outer ends of the brackets 56 are hangers 58 which are bifurcated and at their outer ends have pins 60 on which the casings 11 of the teat cups are pivotally supported. It will be evident that this last pair of teat cups will move vertically in harmony with the plunger, but may be freely adjusted in a horizontal plane so as to be readily attached to the two remaining teats of the animal. By preference the teat cups are detachably supported on the frames. In the illustrated design the bifurcated ends of the hangers have horizontal notches 61 in which the pins 50 seat, and said pins are held seated in them by latches 63 pivoted to the brackets.

For convenience in applying the teat cups to the animal I have provided a shouldered stud 62 on the cover 20 of the pulsator casing. This is adapted to be engaged by the fork 64 having a handle 65. The operator by supporting the pulsator and teat cups by this fork may readily hold it in one hand while he employs the other hand to adjust the teat cups to the animal. The milk pail cover has a cock 9 which opens and closes connection between the tube 6 and the inside of the milk pail. In practice, when it is desired to apply the apparatus to the animal the cock 9 is opened as shown in Figure 1, the result being that the insides of lining 10 are all connected to vacuum; hence when the teat cups are passed up onto the teats of the animal and adjusted in place the suction will hold the teat cups, and with them the pulsator, in place upon the animal. In other words, the teat cups and pulsator are held in place by vacuum and hence in this machine not only are the teat cups suspended from the animal but the pulsator also.

Operation: When tube 14 and milk pail 5 are under vacuum, as in the regular operation of the machine, the piston 26 will move up and down in its casing, thus operating the link 34 and arm 38 and connected valve mechanism in such manner as to maintain this reciprocating movement of the piston. The movement of the piston will be transmitted to one pair of teat cups through the frame carried by the rod 28, which is mounted in said piston. The remaining pair of teat cups will, of course, remain stationary or at least will always remain at the same elevation as the casing 18, but as the udder of the animal is flexible and offers a yielding resistance to a pull or push, it will be found that in practice all of the teat cups move, one pair moving upward as the alternate pair moves downward, and vice versa. This produces two effects. One is a gentle and uniform movement toward and from the udder, and the other is a downward pull on one pair of teats at a time when the opposite pair is being released or moved upward. The mechanism is so timed that the linings 10 will squeeze the teat at the same time that the teat cup is pulling down upon it, thus producing the same action as would be produced by hand milking or by a calf. The movement is consequently most natural and hence promotes contentment in the animal— an advantage that is well recognized by those familiar with the use of milking machines.

Having thus described my invention what I claim as new and desire to secure by Letters Patent is:

1. A milking machine having a plurality of teat cups adapted to maintain themselves by suction upon the teats of the animal, a pulsator having a casing and a piston working therein, a jointed bracket connecting the pulsator casing with one of the teat cups, said bracket permitting freedom of movement in a horizontal plane but preventing movement in a vertical direction relatively to the pulsator casing, and a second jointed bracket connecting the piston with another one of the teat cups, said bracket permitting freedom of movement in a horizontal plane but preventing movement in a vertical direction relatively to the piston.

2. A milking machine having a plurality of teat cups, a pulsator having a casing and a piston working therein and two frames, one of which is carried by the pulsator casing and the other by the plunger, said teat cups being pivotally supported upon said frames so as to be oscillatable about a horizontal axis.

3. A milking machine provided with a pulsator having a casing and a piston working therein, two frames, one supported on the casing and the other on the piston, and teat cups on said frames, one of the frames having a teat cup at each end whereby they come on diametrically opposite sides of the pulsator and said frame being supported between its ends and mounted pivotally on its support whereby the teat cups are self-adjusting to the udder of the animal.

4. A milking machine having four teat cups, a pulsator having a casing and a piston working therein, and two frames each supporting a pair of teat cups on opposite sides of the pulsator, said frames being disposed approximately at right angles and supported between their ends, pivotally, whereby all of the teat cups may individually adjust themselves to the udder of the animal.

5. A milking machine having a plurality of teat cups, a pulsator having a casing, and a piston working therein, and two frames, one frame being pivotally supported upon the pulsator casing and the other frame being pivotally supported upon the piston, said teat cups being supported upon said frames, and said frames being jointed whereby the teat cups may have a swinging movement confined to a horizontal plane.

6. A milking machine having teat cups, a pulsator, frames for connecting the teat cups to the pulsator, said frames having bifurcated ends, pins projecting from the sides of the teat cups, and latches for holding said pins in engagement with the bifurcated ends of the frames.

7. A milking machine having a pulsator having a casing and a piston reciprocating in said casing, four teat cups grouped around said pulsator at about the same level, and two frames, one supported on the pulsator casing, and the other on the piston, said frames each supporting a pair of teat cups and including brackets hinged to each other so as to swing about vertical axes.

In witness whereof, I have hereunto subscribed my name.

JACOB J. STAMPEN.